GAIN-MODULATED AMPLIFIER
Filed Aug. 22, 1955
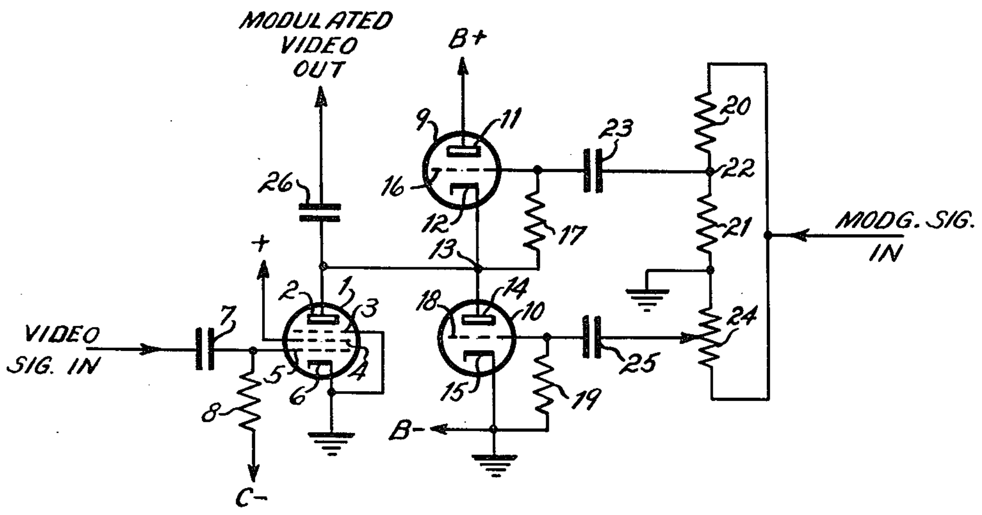
INVENTOR.
CHARLES L. OLSON
BY
F. A. Rechif
ATTORNEY 2,794,077
Patented May 28, 1957

2,794,077

GAIN-MODULATED AMPLIFIER

Charles L. Olson, Collingswood, N. J., assignor to Radio Corporation of America, a corporation of Delaware Application August 22, 1955, Serial No. 529,839
10 Claims. (Cl. 179—171)

This invention relates to an amplifier, and more particularly to an amplifier whose gain is caused to vary in response to an externally-applied voltage.

For certain applications, such as driving the grid of a cathode ray indicator tube in a radar plan position indicator (P. P. I.) system or driving the grids of direct view storage tubes or of so-called Graphechon storage tubes in radar systems using these storage tubes, a gain-modulated video signal is required. To satisfy this requirement, the gain of a video amplifier stage must be modulated or caused to vary with time. This gain modulation must be effected without modulating the pedestal in the same manner, or, in terms of an amplifier tube, the gain of the amplifier tube must be varied without varying the average voltage at its anode. To express this another way, the gain-modulating voltage (which varies with time and which may be of sawtooth waveform) must not mix with the video signal being amplified, so as to itself appear in the anode circuit of the amplifier; the gain-modulating voltage must only modulate the amplifier gain and must not mix with the signal being amplified.

Previous to this invention, the common practice was to use an ordinary modulator (e. g., a pentode having the video signal applied to one grid thereof and the gain-modulating voltage applied to another grid thereof) and then cancel the resultant (modulated) pedestal later with a waveform whose shape is the negative of the pedestal. The several controls required to adjust such a system for the desired degree of cancellation, however, necessarily interact with each other, leading to almost insurmountable difficulties of adjustment. Also, other difficulties are present in such a system which prevent complete cancellation of the modulation appearing on the pedestal.

An object of this invention is to devise a novel gain-modulated amplifier.

Another object is to provide an amplifier whose gain varies in response to a modulating voltage and which does not produce a pedestal which is modulated in the same manner.

A further object is to devise an amplifier the gain of which is varied by a control voltage but in which no mixing of the control voltage with the signal being amplified by the amplifier occurs.

The objects of this invention are obtained, briefly, in the following manner: an electronically variable resistance is used as a load on a constant current generator, such as a pentode video amplifier tube. This variable resistance consists of two electron discharge devices such as triodes in series across the anode voltage source, the grids being driven cophasally with the gain-modulating voltage.

The foregoing and other objects of the invention will be better understood from the following description of an exemplification thereof, reference being had to the accompanying drawing, wherein the single figure is a circuit schematic of an amplifier utilizing this invention.

Now referring to the drawing, a pentode vacuum tube 1, for example a type 6AU6 or a type 6AH6 tube, is connected as a video amplifier and it is the gain of this tube that is to be modulated by the circuit arrangement of this invention. Tube 1 includes an anode 2, a suppressor grid 3, a screen grid 4, a control grid 5 and a cathode 6. Suppressor grid 3 is connected to cathode 6, which latter is grounded. The video signal which is to be amplified is fed to control grid 5 by way of a coupling capacitor 7, and a negative operating bias is supplied to control grid 5 from a separate source (not shown) through a grid leak resistor 8, as indicated by the legend C–. The screen grid 4 is connected to a suitable source of positive screen grid voltage.

Two triode electrode structures 9 and 10, which may for example be the two halves of a twin triode vacuum tube such as type 12AU7 or 12AT7, serve as the modulating structures for amplifier 1. The anode-cathode paths of the two structures 9 and 10 are connected in series across the unidirectional anode voltage source. For this purpose, the anode 11 of tube 9 is coupled directly to the positive terminal B+ of the anode voltage source, the cathode 12 of tube 9 is coupled directly at junction point 13 to the anode 14 of tube 10, and the cathode 15 of tube 10 is connected to ground, which is the negative terminal B— of the anode voltage source. Tube 9 serves as the anode load resistance for tube 1, and for this purpose a direct current connection extends between anode 2 and the common junction 13 of the two series-connected tubes 9 and 10. Therefore, the potential of point 13 is the anode potential of tube 1.

The modulating tubes 9 and 10 are operated with only about a volt of grid leak bias or contact potential bias, by connecting grid 16 of tube 9 to cathode 12 of the same tube through a resistor 17, and by connecting grid 18 of tube 10 to cathode 15 of the same tube through a resistor 19.

The gain-modulating signal, which may for example be a negative-going sawtooth voltage wave if an increase with time of the gain in video amplifier tube 1 is desired, is fed in phase or cophasally to the grids of the two modulator triodes 9 and 10. For the upper triode 9, the modulating signal is applied across two voltage-dividing series resistors 20 and 21, the lower end of resistor 21 being grounded, and a portion of the modulating sawtooth wave is fed from the common junction point 22 of resistors 20 and 21 through a coupling capacitor 23 to grid 16 of tube 9. For the lower triode 10, the modulating signal is applied across a potentiometer 24 one end of which is grounded, and the movable tap on potentiometer 24 is connected through a coupling capacitor 25 to grid 18 of tube 10. The voltage dividing arrangement for grid 16, along with the potentiometer 24, enables proper balance of the two tubes to be achieved. In the manner described, the grids 16 and 18 of the two triodes 9 and 10 are driven in the same phase by the modulating signal.

The two tubes 9 and 10 together constitute an electronically variable resistance, and one of these tubes (upper tube 9) constitutes the anode load resistance for the pentode amplifier 1 which, as is known to those skilled in the art, is a constant current generator. As the anode load resistance of an amplifier tube changes, its gain also changes. To be more specific, an increase of the anode load resistance of an amplifier ordinarily increases the amplifier gain, and vice versa. According to this invention, gain modulation in the amplifier tube 1 is obtained by using the electronically variable resistance afforded by triodes 9 and 10, and by varying the effective resistance provided by the triodes in accordance with the modulating voltage of sawtooth or other waveform. It will now be explained in what manner the effective resistance afforded by the two triodes is caused to vary, thus varying the gain of the amplifier tube 1. At the same time, the average voltage at anode 2 does not vary, so no mixing occurs and no variation or modulation of the pedestal takes place.

When the modulating signal applied to the two grids 16 and 18 varies in amplitude, the current through tubes 9 and 10 also varies due to the change in grid voltage, but the current change is equal and in the same direction in the two tubes, since the two triodes are matched and since the modulating signal is applied cophasally to the two grids. The provision of the voltage divider 20—21 and the potentiometer 24 enables adjustment to be made to the proper match point. Since the current change is equal and in the same direction in the two matched triodes and since the anode-cathode paths of the two tubes are connected in series across the fixed unidirectional potential source, the voltage at point 13, where the cathode 12 of the upper tube 9 is tied to the anode 14 of the lower tube 10, does not change with respect to ground. The voltage at point 13 remains fixed at substantially one-half the voltage of the unidirectional anode supply voltage source, with respect to ground. The voltage at point 13 is the voltage applied to anode 2 of amplifier tube 1, so the average voltage at anode 2 does not vary, which means that the pedestal is not modulated, and this even though the modulating signal applied to grids 16 and 18 is made to vary over a wide amplitude range.

The current through the triodes 9 and 10 does change as the modulating signal applied to grids 16 and 18 changes and, since the voltage drops across these respective tubes do not change, the impedance of these tubes, both static and dynamic, changes in inverse proportion to the current change. Therefore, the equivalent circuit of triodes 9 and 10 for alternating current, looking into the center point 13, is simply a variable resistor, variable in response to the modulating signal voltage applied to grids 16 and 18. The effective impedance of tube 9 is used as an anode load resistance for amplifier tube 1, since the anode 2 of tube 1 is D. C.-coupled to the anode voltage source only through the anode-cathode path of tube 9. In other words, the variable resistor afforded by tube 9 is used as the anode load for the constant-current pentode amplifier 1. As the effective impedance of tube 9 changes in inverse proportion to the current change therethrough, which in turn is the result of a changing modulating signal applied to grids 16 and 18, the anode load resistance of tube 1 is made to change. This changes the amplification or gain of tube 1 in accordance with the modulating signal (e. g., of sawtooth waveform) applied to grids 16 and 18. At the same time, since the average voltage at anode 2 of tube 1 does not vary, there is no modulation of the pedestal and no mixing of the gain-modulating signal (sawtooth) with the signal being amplified, which latter is applied to control grid 5 for amplification in tube 1. As a practical example, the ratio of the highest gain of amplifier tube 1 to the lowest gain thereof may be 4:1. The lower triode 10 functions mainly only to fix or maintain constant the pedestal level and has no real effect in modulating the gain of amplifier tube 1.

While tube 9 is the controlling or variable or changing impedance, the total load on tube 1 is the impedance of tube 9 in parallel with that of tube 10, the parallel connection being completed through the power supply. In the circuit disclosed, the effective impedance of tube 10 is very much greater than that of tube 9, since the latter is operating in the manner of a low-impedance cathode follower. Therefore, the parallel impedance of these two tubes will approximately equal that of tube 9 alone. Since tube 9 provides a rather low anode impedance for pentode 1, the circuit disclosed is a video amplifier having a wide bandwidth.

The amplified video signal applied to control grid 5, which signal is modulated in gain in response to the modulating signal applied to grids 16 and 18, appears at anode 2 and may be taken off for utilization by means of an output connection including a capacitor 26, coupled to anode 2.

In a device built according to this invention and successfully tested, an increase of gain with time was desired. Therefore, a negative-going sawtooth voltage was applied as a modulating signal to grids 16 and 18, to gain-modulate the video amplifier tube 1. The modulation tubes 9 and 10 were used with no bias except for about a volt of grid leak bias or contact potential bias, as illustrated.

If a decrease of gain with time were desired, the modulating signal would be made a positive going sawtooth voltage and the modulator tubes 9 and 10 would be biased off enough to avoid grid current.

What is claimed is:

1. An amplifier comprising an electrode structure including at least an anode electrode and a signal input electrode, means for applying signals to be amplified to said signal input electrode, a pair of controllable-resistance electron discharge devices connected in series across a source of unidirectional anode supply voltage, a direct current connection between the common junction of said devices and said anode electrode, and means for applying other signals to both of said devices with the same phase to control the resistances thereof.

2. An amplifier comprising an electrode structure including at least an anode electrode and a control electrode, means for applying signals to be amplified to said control electrode, a pair of controllable-resistance electron discharge devices connected in series across a source of unidirectional anode supply voltage, a connection capable of passing unidirectional current and devoid of concentrated impedance between the common junction of said devices and said anode electrode, and means for applying other signals to both of said devices to control the resistances thereof in the same direction.

3. An amplifier comprising an electrode structure including at least an anode electrode and a signal input electrode, means for applying signals to be amplified to said signal input electrode, two controllable-resistance electron discharge devices each having at least an anode electrode and a cathode electrode, means connecting the anode-cathode paths of said devices in series across a source of unidirectional anode supply voltage, a connection capable of passing unidirectional current between the common junction of said two anode-cathode paths and the anode electrode of said structure, and means for applying other signals to both of said devices with the same phase to control the resistances thereof.

4. An amplifier comprising an electrode structure including at least an anode electrode and a grid electrode, means for applying signals to be amplified to said grid electrode, two controllable-resistance electron discharge devices each having at least an anode electrode and a cathode electrode, means connecting the anode-cathode paths of said devices in series across a source of unidirectional anode supply voltage, a direct current connection devoid of concentrated impedance between the common junction of said two anode-cathode paths and the anode electrode of said structure, and means for applying other signals to both of said devices to control the resistances thereof in the same direction.

5. An amplifier comprising an electron discharge device having at least an anode electrode and a signal input electrode, means for applying signals to be amplified to said signal input electrode, two controllable-resistance electron discharge devices connected in series across a source of unidirectional anode supply voltage, said last-mentioned devices each having a control electrode; a direct current connection devoid of concentrated impedance between the common junction of said last-mentioned devices and said anode electrode, and means for applying other signals to both of said control electrodes with the same phase.

6. An amplifier comprising an electron discharge device having at least an anode electrode and a control electrode, means for applying signals to be amplified to said control electrode, two controllable-resistance electron discharge devices connected in series across a source of unidirectional anode supply voltage, said last-mentioned devices each having a control electrode; a direct current connection between the common junction of said last-mentioned devices and said anode electrode, and means for applying other signals cophasally to said last-mentioned control electrodes.

7. A gain-modulated amplifier comprising an electrode structure including at least an anode electrode and a signal input electrode, means for applying signals to be amplified to said signal input electrode, two electron discharge devices each having an anode, a cathode, and a control electrode, means connecting the anode of the first device to the positive terminal of a unidirectional anode voltage source, means connecting the cathode of the first device to the anode of the second device, means connecting the cathode of the second device to the negative terminal of said source, means connecting the anode electrode of said structure to the common junction of the cathode of the first device and the anode of the second device through a connection devoid of concentrated impedance, and means for applying gain-modulating signals to both of said control electrodes.

8. A gain-modulated amplifier comprising an electrode structure including at least an anode electrode and a grid electrode, means for applying signals to be amplified to said grid electrode, two electron discharge devices each having an anode, a cathode, and a control electrode, means connecting the anode of the first device to the positive terminal of a unidirectional anode voltage source, means connecting the cathode of the first device to the anode of the second device, means connecting the cathode of the second device to the negative terminal of said source, a direct current connection devoid of concentrated impedance between the anode electrode of said structure and the common junction of the cathode of the first device and the anode of the second device, and means for applying gain-modulating signals to both of said control electrodes.

9. A gain-modulated amplifier comprising an electron discharge device having at least an anode and a control grid, means for applying signals to be amplified to said control grid, first and second electron discharge devices each having an anode, a cathode and a control electrode, means connecting the anode of said first device to the positive terminal of a unidirectional anode voltage source, means connecting the cathode of said first device to the anode of said second device, means connecting the cathode of said second device to the negative terminal of said source, a direct current connection devoid of concentrated impedance between the anode of said first-named device and the common junction of the cathode of said first device and the anode of said second device, and means for applying gain-modulating signals cophasally to both of said control electrodes.

10. A gain-modulated amplifier comprising a first vacuum tube having at least an anode and a control grid, means for applying signals to be amplified to said control grid, second and third vacuum tubes each having an anode, cathode, and a control electrode, means connecting the anode of said second tube to the positive terminal of a unidirectional anode voltage source, means connecting the cathode of said second tube to the anode of said third tube through a connection devoid of concentrated impedance, means connecting the cathode of said third tube to the negative terminal of said source, a connection capable of passing unidirectional current and devoid of concentrated impedance between the anode of said first tube and the common junction of the cathode of said second tube and the anode of said third tube, means for applying gain-modulating signals cophasally to both of said control electrodes, and an output connection coupled to the anode of said first tube.

References Cited in the file of this patent

UNITED STATES PATENTS

| | | |
|---|---|---|
| 2,305,919 | Eaton | Dec. 22, 1942 |
| 2,631,198 | Parisoe | Mar. 10, 1953 |
| 2,662,938 | Goldstine | Dec. 15, 1953 |